United States Patent [19]
Ishimi

[11] 3,868,860
[45] Mar. 4, 1975

[54] VARIABLE TRANSMISSION UTILIZING OSCILLATING LINKS AND ONE-WAY CLUTCHES

[76] Inventor: Bun-Ichi Ishimi, No. 5-15, 2 chome, Shimmori, Asahi-ku, Osaka, Japan

[22] Filed: Aug. 29, 1973

[21] Appl. No.: 392,468

[30] Foreign Application Priority Data
Aug. 30, 1972  Japan.................................. 47-86956

[52] U.S. Cl. ................................................. 74/63
[51] Int. Cl. ........................................... F16h 21/12
[58] Field of Search .......................................... 74/63

[56] References Cited
UNITED STATES PATENTS
1,803,458   5/1931   Berry ..................................... 74/63
2,492,071  12/1949   Sevensson ............................. 74/63
2,546,282   3/1951   Warren .................................. 74/63

*Primary Examiner*—Wesley S. Ratliff, Jr.
*Attorney, Agent, or Firm*—Wenderoth, Lind & Ponack

[57] ABSTRACT

A stepless variable speed transmission having an input shaft and an output shaft which are coaxial. Pairs of oscillating link groups and one-way clutch groups are provided to double the number of rotations of the output shaft as compared with that of a transmission which does not have such pairs. A clutch is provided to transmit the rotation of the input shaft directly to the output shaft when the output shaft has attained a high speed.

3 Claims, 5 Drawing Figures

PATENTED MAR 4 1975

VARIABLE TRANSMISSION UTILIZING OSCILLATING LINKS AND ONE-WAY CLUTCHES

This invention relates to a variable transmission which achieves the required transmission ratio by the use of oscillating links and one-way clutch groups.

A first object of this invention is to provide a variable speed transmission comprising oscillating links and a pair of one-way clutch groups for transmission of the rotations of an input shaft to an output shaft at variable ratios, the rotations of the input shaft being transmitted to the output shaft by a first clutch group, and rotations being imparted to said first clutch group by a second clutch group, thereby making it possible to double the number of rotations of the output shaft relative to the input shaft.

A second object of this invention is to provide a variable speed transmission as described hereinbefore, in which the input and output shafts are integrally locked to each other at a time when the rotation of the output shaft attains a high speed, thereby enabling the input and output shafts to rotate at an identical speed.

These and other objects are accomplished by the parts, improvements, combinations and arrangements comprising the invention, a preferred embodiment of which is shown by way of example in the annexed drawings and herein described in detail. In the drawings.

Referring now to FIGS. 1 to 5, the numeral 11 designates a casing, coaxially disposed bearings 12 and 13 being provided on opposite end walls of the casing 11.

Figure 1:
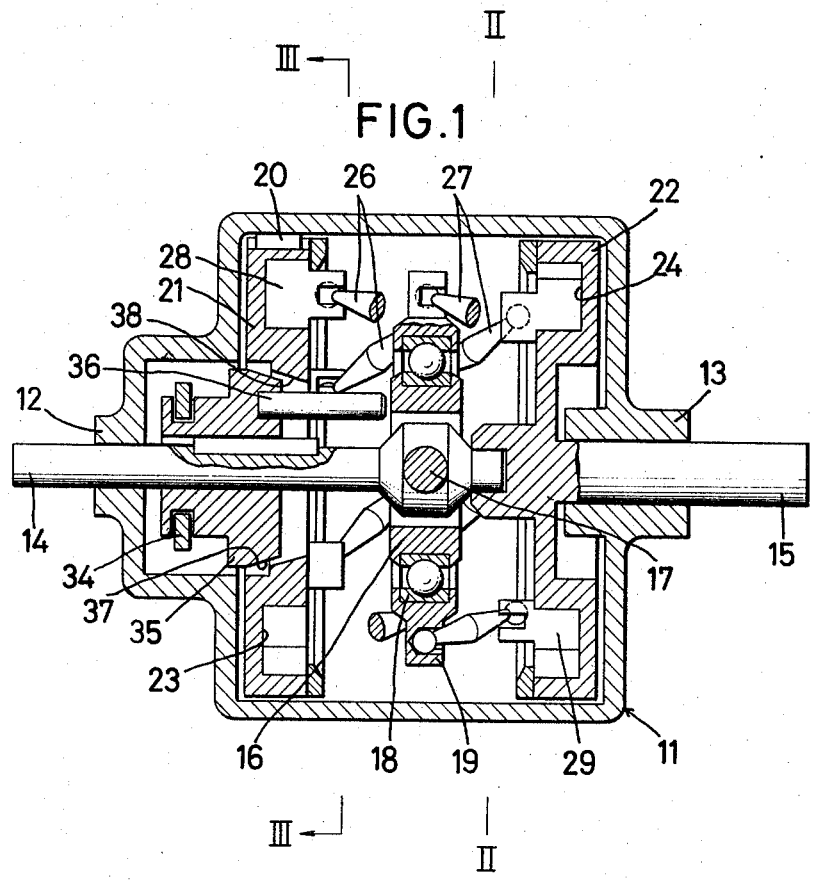
FIG. 1 is a longitudinal, sectional elevation showing a preferred embodiment of this invention.
Figure 2:
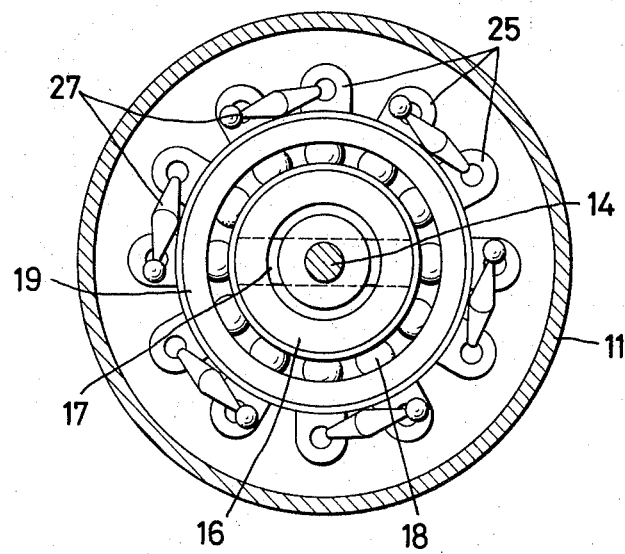
FIG. 2 is a transverse sectional view taken on line II—II of FIG. 1.
Figure 3:
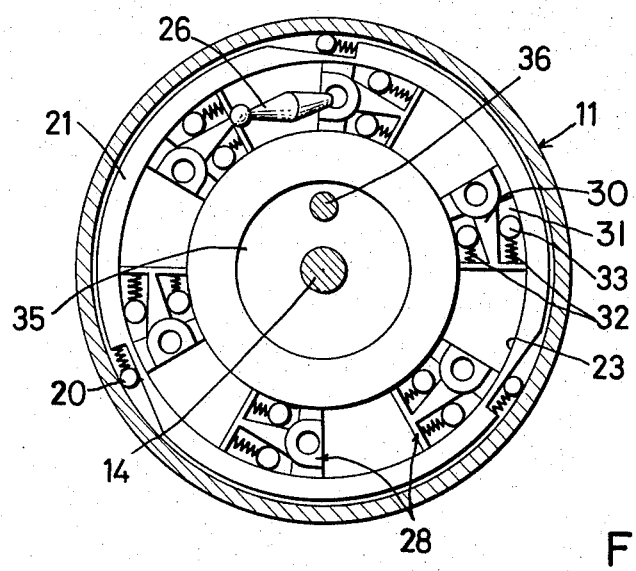
FIG. 3 is a transverse sectional view taken in the direction of the arrows on line III—III in FIG. 1.

An input shaft 14 is rotatably supported by the bearing 12 on the left-hand side of FIG. 1, an output shaft 15 being rotatably supported by the bearing 13 on the right-hand side of FIG. 1, respectively, the terminal of the input shaft 14 being journaled in a recess in the output shaft 15.

On the middle portion of the input shaft 14 within the casing 11 is externally fitted an inner wheel 16 acting as an oscillating inclined plate and pivotally mounted on a spindle 17 extending diametrically through said inner wheel 16 and the input shaft 14.

Around the exterior periphery of the inner wheel 16 is an outer wheel 19 mounted on a ball bearing 18 so as to be rotatable relative to said inner wheel 16.

At one end within the casing 11, on the left-hand side of FIG. 1, is provided an annularly grooved disk 21 externally fitted on the input shaft 14, the exterior periphery of said grooved disk 21 being supported by the interior periphery of the casing 11 through a plurality of one-way clutches 20, and grooved disk 21 being rotatable by said one-way clutches 20 in the same direction with the input shaft 14 and not rotatable in the opposite direction. On the right-hand side of FIG. 1 is provided an annularly grooved disk 22 integrally fixed to the output shaft 15, the exterior periphery of said grooved disk 22 loosely fitting the inside of the casing 11. On the opposed end faces of the disks 21 and 22 are provided annular concave grooves 23 and 24 each concentric with the input shaft 14.

On the exterior periphery of the outer wheel 19 are a number of hinges 25, the base ends of link groups 26 and 27 being connected by universal joints to the hinges 25 so that the free ends thereof extend toward the input side and output side alternately and are inclined relative to shafts 14 and 15, each link being oscillatable in all directions around the base end thereof.

To the free ends of links 26 and 27 are fixed one-way clutches 28 and 29 respectively, through universal joints, the clutches 28 and 29 being positioned within the concave grooves 23 and 24 respectively in the grooved disks 21 and 22.

On both sides of a wedge member 30 slidably fitted into the concave groove is provided a notch 31 so that the width of the notch is gradually reduced, and within each said notch 31 is a roller 33 constantly pressed toward the narrower end by a spring 32, the roller 33 being adapted to act upon the peripheral side of the concave groove when the wedge member 30 is pressed by the link, whereby the grooved disk and the wedge member are secured to each other.

On the middle portion of the input shaft 14, on the left-hand side of FIG. 1, is externally fitted a block-shaped sleeve 35, the sleeve 35 being fixed to the input shaft 14 in the direction of the rotation thereof and axially slidable thereon by means of a key and a key groove, said sleeve 35 being axially oscillatable by a shifter 34 so mounted as to project into the casing 11. To the exterior periphery of the sleeve 35 confronting the inner wheel 16 is secured a push rod 36 projecting toward said inner wheel 16 and adapted to incline said inner wheel 16 as the sleeve 35 is moved thereto, and on the exterior periphery of the sleeve 35 is a conic face 37 having a smaller diameter at the end portion thereof toward the inner wheel.

On the interior periphery of the grooved disk 21 located on the left-hand side of FIG. 1 is an inwardly bored conic face 38 coinciding with the conic face 37 of the sleeve 35 when said sleeve 35 approaches said grooved disk 21, said two conic faces 37 and 38 acting together to produce a clutch action for engaging and disengaging the sleeve 35 and the grooved disk 21.

Although not illustrated in detail in the drawings, each one-way clutch group 28 or 29 is constantly drawn in the non-action direction thereof by springs extending axially of each link 26 and 27 thereby enabling the one-way clutch to slide smoothly in regard to the grooved disk, the position of the one-way clutch caused by the spring being adapted to be lower than the connecting portion to the link so as to impart sufficient resilience to the one-way clutch to bring the underside thereof into pressure contact with the bottom of the concave groove, with the result that the pulsation of the one-way clutch is precluded by the prevention of the occurrence of a clearance arising at the connecting portion to the link and the fitting portion in the concave groove.

The operation of the foregoing embodiment will be explained hereinunder.

With the parts in the position FIG. 1 in which the sleeve 35 is retracted by the shifter 34 in the left-hand direction, and the push rod 36 is separated from the inner wheel 16, if the input shaft 14 connected to a drive source is rotated, the sleeve 35 and the inner wheel 16 alone are rotated, the output shaft 15 remaining stationary.

Figure 4:
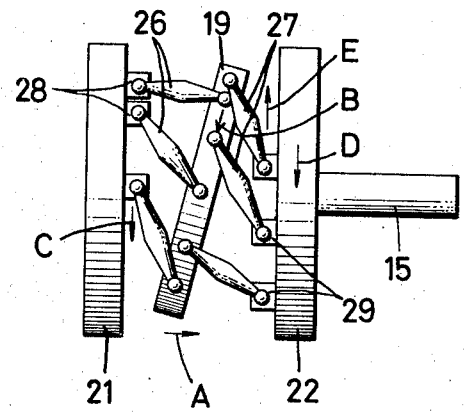
FIGS. 4 and 5 are diagrams explaining the principles of action of the foregoing embodiment.
Figure 5:
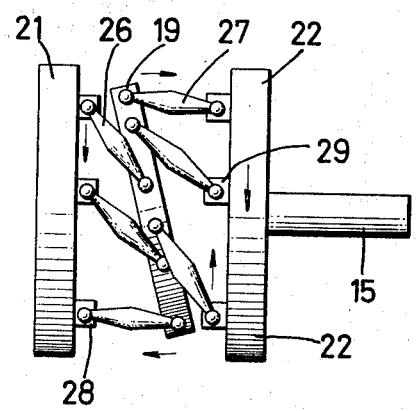

If the sleeve 35 is moved in the right-hand direction in FIG. 1 from the aforementioned state by operating the shifter 34, the inner wheel 16 pressed by the front end of the push rod 36 is inclined around the spindle 17, said inner wheel 16 rotating in the inclined state together with the input shaft 14, the outer wheel 19 externally fitted on the inner wheel 16 on the ball bearing 18 being oscillated by moving repeatedly through the positions shown in FIGS. 4 and 5 in turn.

In transition from the position of FIG. 4 to that of FIG. 5, if the outer wheel 19 is moved in the direction A indicated by arrow in FIG. 4 by the pivoting of the inner wheel 16, axial pressure is applied to the link 26 whose base end of which is located higher than the oscillation center of the outer wheel 19, the one-way clutch 28 pressed by the link connected thereto and engages with the concave groove 23 of the grooved disk 21, with the result that the outer wheel 19 is pressed and rotated by the link 26 in the direction B indicated by the arrow since the disk 21 is not rotatable in the direction of pressure due to the one-way clutch 20.

Axial pull is applied to the link the base end of which is located lower than the oscillation center of the outer wheel 19, the one-way clutch 28 pulled by the link sliding relative to the concave groove 23, whereby the one-way clutch 28 is drawn in the direction C indicated by the arrow thereby permitting the rotation of the outer wheel 19.

Now, as for the group of links 27 on the side of the output shaft, axial pressure is applied to the link the base end of which is located lower than the oscillation center of the outer wheel 19, the one-way clutch 29 pressed by said link 27 engaging with the concave groove 24 of the grooved disk 22, said disk 22 rotating through the one-way clutch 29 in the direction D indicated by the arrow.

The link the base end of which is located higher than the oscillation center of the outer wheel 19 is subjected to axial pull, the one-way clutch 29 pulled by the link sliding in the concave groove 24 in the direction E indicated by arrow thereby permitting the rotation of the grooved disk 22.

Since the links and the one-way clutches on the side toward the input shaft and on the side toward the output shaft are provided in pairs respectively, the action of the one-way clutches is multiplied with the result that the outer wheel 19 is continuously rotated in the direction B indicated by the arrow by the links 26 and the one-way clutch 28 group on the side of the input shaft, the grooved disk 22 being continuously rotated by the links 27 and the one-way clutch 29 group on the side of the output axis in the direction D indicated by the arrow which is identical with that of the outer wheel 19, whereby the output axis 15 is driven in the same direction with the input axis as double the number of rotations as a result of the addition of the rotation of the inner wheel to that of the grooved disk 22.

Furthermore, the transmission ratio can be changed by changing the angle of inclination of the inner wheel 16 by means of the push rod 36 of the sleeve 35, the creeping stroke of the one-way clutch by the link group being small when the inclination of the inner wheel 16 is small, so that the movement of the outer wheel 19 and the grooved disk 22 by the clutch group is small, as a result of which the transmission ratio becomes greater.

On the contrary, if the angle of inclination of the inner wheel 16 is increased, the creeping stroke of the one-way clutch group becomes greater resulting in a smaller transmission ratio.

In the state in which the output shaft 15 is rotated at high speed, by moving the sleeve 35 by the shifter 34 to the extreme forward position, the sleeve 35 and the grooved disk 21 are connected by the engaging of the conic faces 37 and 38 with each other, and the input shaft 14, grooved disk 21, outer wheel 19, grooved disk 22, and output shaft 15 are locked through the links and one-way clutches, with the result that the input shaft 14 and the output shaft 15 are fixedly connected thereby producing an indentical rotation ratio.

In case the lock mechanism as described hereinbefore is not needed, the grooved disk 21 can be secured to the casing and the conic faces 37 and 38 can be omitted.

What is claimed is:

1. A variable speed transmission, comprising an input shaft, an output shaft coaxial with the input shaft, an inner wheel mounted on said input shaft for rotation therewith and for pivoting movement around an axis transverse to said input shaft, an outer wheel rotatably mounted on said inner wheel for rotation around the periphery of said inner wheel, an output disc fixed on said output shaft, a plurality of links each having one end pivotally mounted on said outer wheel and having the other ends in one way clutching engagement with said output disc and being inclined to the shafts, a fixable disc around said input shaft, means associated with said fixable disc for fixing it against rotation relative to said input shaft, a further plurality of links each having one end pivotally mounted on said outer wheel and having the other ends in one way clutching engagment with said fixable disc and being inclined to the shafts in the same direction as said firstmentioned plurality of links, the one way clutching engagement of said links with said discs being such as to produce clutching acting when said links are urged in a direction relative to the discs toward the obtuse angle between the links and the discs, and means engageable with said inner and outer wheels for pivoting them.

2. A variable speed transmission as claimed in claim 1 in further comprising clutch means on said input shaft and movable into engagement with said fixable disc for rotating said fixable disc with said input shaft for locking said input shaft and said output shaft in rotational engagement.

3. A variable speed transmission as claimed in claim 2 in which said means for pivoting said wheels and said clutch means are connected whereby said clutch means engages said fixable disc only when said pivoting means has pivoted said wheels to the extreme position.

* * * * *